United States Patent
Kamada (10) Patent No.: US 10,427,372 B2
(45) Date of Patent: Oct. 1, 2019

(54) TIRE VULCANIZING DIE, CASTING DIE FOR CASTING TIRE VULCANIZING DIE, AND METHOD FOR MANUFACTURING TIRE VULCANIZING DIE

(71) Applicant: Toyo Tire & Rubber Co., Ltd., Itami-shi, Hyogo (JP)

(72) Inventor: Nobuyuki Kamada, Itami (JP)

(73) Assignee: Toyo Tire Corporation, Itami-shi (JP)

( * ) Notice: Subject to any disclaimer, the term of this patent is extended or adjusted under 35 U.S.C. 154(b) by 0 days.

(21) Appl. No.: 16/048,708

(22) Filed: Jul. 30, 2018

(65) Prior Publication Data

US 2019/0054710 A1  Feb. 21, 2019

(30) Foreign Application Priority Data

Aug. 17, 2017 (JP) .................. 2017-157440
Mar. 7, 2018 (JP) .................. 2018-040419

(51) Int. Cl.
| | | |
|---|---|---|
| *B29D 30/06* | (2006.01) | |
| *B22C 9/06* | (2006.01) | |
| *B29C 33/38* | (2006.01) | |
| *B22D 25/02* | (2006.01) | |
| *B22C 9/22* | (2006.01) | |

(52) U.S. Cl.
CPC .......... *B29D 30/0606* (2013.01); *B22C 9/06* (2013.01); *B22C 9/22* (2013.01); *B22D 25/02* (2013.01); *B29C 33/3842* (2013.01); *B29D 2030/0612* (2013.01); *B29D 2030/0613* (2013.01); *B29K 2905/02* (2013.01); *B29K 2905/12* (2013.01)

(58) Field of Classification Search
CPC ........ B29D 30/0606; B29D 2030/0612; B29D 2030/0613; B22C 7/00; B22C 9/06; B22C 13/00

See application file for complete search history.

(56) References Cited

U.S. PATENT DOCUMENTS

| | | | | |
|---|---|---|---|---|
| 3,570,571 A | * | 3/1971 | Riches ............. | B29D 30/0606 152/209.21 |
| 6,264,453 B1 | * | 7/2001 | Jacobs ............. | B22F 5/00 152/DIG. 3 |
| 9,022,083 B2 | * | 5/2015 | Voss ............. | B29D 30/0606 152/209.18 |
| 9,205,613 B2 | * | 12/2015 | Montbel ............. | B29D 30/0606 |

FOREIGN PATENT DOCUMENTS

| | | |
|---|---|---|
| JP | 2004-243389 A | 9/2004 |
| JP | 2005-280316 A | 10/2005 |
| JP | 2017-30397 A | 2/2017 |

OTHER PUBLICATIONS

Office Action dated Apr. 18, 2018, issued in counterpart of Japanese Patent Application No. 2018-040419 (with English translation) (6 pages).

\* cited by examiner

*Primary Examiner* — James P Mackey
(74) *Attorney, Agent, or Firm* — Westerman, Hattori, Daniels & Adrian, LLP (57) ABSTRACT

A tire vulcanizing die comprises a tread molding surface; a sipe blade extending along the tread molding surface; and a cast projecting region extending along the tread molding surface from an end of the sipe blade; wherein width of the cast projecting region is greater than width of the sipe blade.

6 Claims, 15 Drawing Sheets

TIRE VULCANIZING DIE, CASTING DIE FOR CASTING TIRE VULCANIZING DIE, AND METHOD FOR MANUFACTURING TIRE VULCANIZING DIE

TECHNICAL FIELD

The present invention relates to a tire vulcanizing die, a casting die for casting a tire vulcanizing die, and a method for manufacturing a tire vulcanizing die.

BACKGROUND ART

There are situations in which sipes are formed on tires. Sipes typically have groove widths that are not greater than 2 mm. Sipes are formed to improve driveability on wet road surfaces and on road surfaces on which there is ice and/or snow.

There are situations in which a sipe at a tire is formed by a sipe blade and a cast projecting region extending along a tread molding surface from an end of the sipe blade. Typically, the sipe blade comprises stainless steel, and the cast projecting region comprises aluminum alloy.

PRIOR ART REFERENCES

Patent References

PATENT REFERENCE NO. 1: Japanese Patent Application Publication Kokai No. 2005-280316

SUMMARY OF INVENTION

Problem to be Solved by Invention

Where a mold that is provided with a sipe blade and a cast projecting region is used repeatedly, because stresses repeatedly act on the cast projecting region, there may be concerns with regard to decrease in endurance. The fact that stresses act on the cast projecting region is due to the fact that the coefficients of thermal expansion of stainless steel and aluminum alloy are different and the fact that stainless steel is harder than aluminum alloy.

It is an object of the present invention to provide a tire vulcanizing die having superior endurance when used repeatedly. It is another object of the present invention to provide a casting die capable of casting such a tire vulcanizing die. It is another object of the present invention to provide a method for manufacturing such a tire vulcanizing die.

Means for Solving Problem

A tire vulcanizing die in accordance with the present invention comprises a tread molding surface; a sipe blade extending along the tread molding surface; and a cast projecting region extending along the tread molding surface from an end of the sipe blade; wherein width of the cast projecting region is greater than width of the sipe blade. A tire vulcanizing die in accordance with the present invention will have superior endurance when used repeatedly than would be the case were width of the cast projecting region not greater than width of the sipe blade.

It is preferred that the sipe blade have a first face; and that a region peripheral to the end of the first face be covered by the cast projecting region. This will make it possible to further improve endurance.

It is preferred that the sipe blade have a second face; and that a region peripheral to the end of the second face be covered by the cast projecting region. This will make it possible to further improve endurance.

The present invention also relates to a casting die for casting a tire vulcanizing die. A casting die in accordance with the present invention comprises a tread casting die surface for molding a tread molding surface of a tire vulcanizing die; a sipe blade provided with a region to be buried which protrudes from the tread casting die surface, and a region to be exposed which is embedded in the tread casting die surface; wherein a groove extending from an end of the region to be exposed is provided at the tread casting die surface; the end of the region to be exposed is exposed by the groove; and width of the groove is greater than width of the region to be exposed. A casting die in accordance with the present invention makes it possible to cast a tire vulcanizing die having superior endurance when used repeatedly.

It is preferred that the casting die in accordance with the present invention be such that the sipe blade has a first face; and a region peripheral to the end of the first face is exposed by the groove. This will make it possible to cast a tire vulcanizing die that is even more superior in endurance. Moreover, as there may be less tendency for molten metal to enter space(s) between the first face of the sipe blade and the casting die main body, this will make it possible to manufacture a tire vulcanizing die having a good casting surface.

It is preferred that the casting die in accordance with the present invention be such that the sipe blade has a second face; and a region peripheral to the end of the second face is exposed by the groove. This will make it possible to cast a tire vulcanizing die that is even more superior in endurance. Moreover, as there may be less tendency for molten metal to enter space(s) between the two faces of the sipe blade and the casting die main body, this will make it possible to manufacture a tire vulcanizing die having a good casting surface.

The present invention also relates to a method for manufacturing a tire vulcanizing die. A method for manufacturing a tire vulcanizing die associated with the present invention comprises an operation in which the casting die is used to cast the tire vulcanizing die. The method for manufacturing a tire vulcanizing die associated with the present invention makes it possible to manufacture a tire vulcanizing die having superior endurance when used repeatedly.

EMBODIMENTS FOR CARRYING OUT INVENTION

Figure 1:
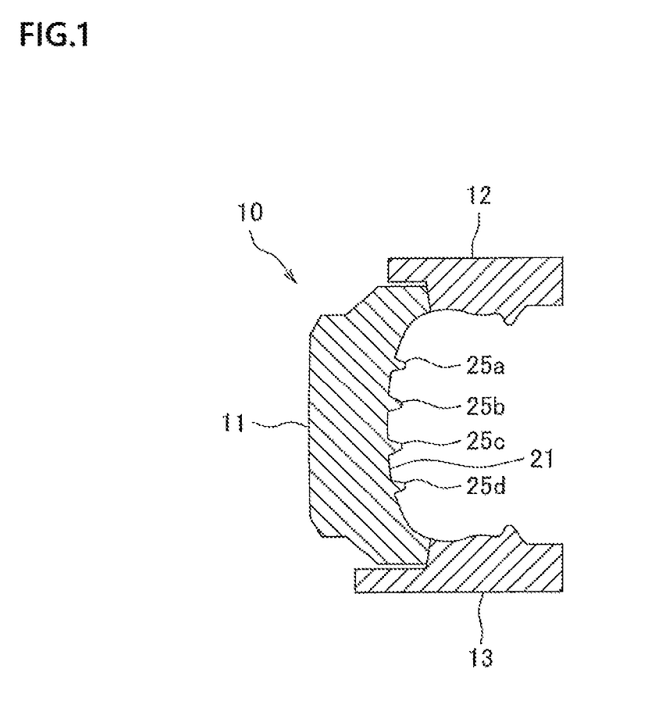
FIG. 1 Vertical sectional view showing in simplified fashion a tire vulcanizing die in accordance with a first embodiment.

As shown in FIG. 1, tire vulcanizing die 10 in accordance with a first embodiment comprises die 11 for molding the tread surface of a tire. Tire vulcanizing die 10 further comprises dies 12, 13 for molding surfaces at sidewall regions. An unvulcanized tire is arranged at tire vulcanizing die 10 in such fashion that the axis of the tire is vertical.

Figure 2:
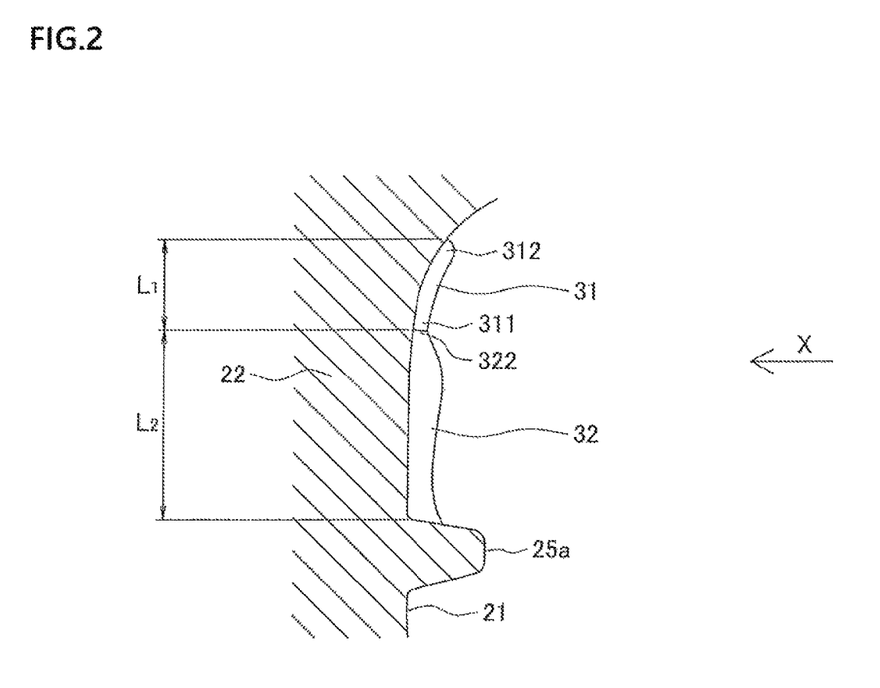
FIG. 2 Enlarged view of a portion of what is shown in FIG. 1.

As shown in FIG. 2, die 11 comprises main body 22 having tread molding surface(s) 21. Main body 22 comprises metal material(s). More specifically, main body 22 might comprise aluminum alloy(s). As aluminum alloy, AC4-type alloy, AC7-type alloy, and so forth may be cited as examples.

Die 11 comprises projections 25a, 25b, 25c, 25d (hereinafter sometimes referred to collectively as "projections 25") which extend along tread molding surface 21 (see FIG. 1). If the two edges of the tire contact patch are defined as the first contact patch edge and the second contact patch edge, projection 25a is the nearest of projections 25 to the first contact patch edge. Projection 25d is the nearest of projections 25 to the second contact patch edge. Projections 25 extend in the tire circumferential direction 91 (see FIG. 3). Where it is said that "projections 25 extend in the tire circumferential direction 91," this is intended to include both the situation in which projections 25 extend in uninclined fashion with respect to the tire circumferential direction 91 and the situation in which projections 25 extend in inclined fashion with respect to the tire circumferential direction 91. The metal material(s) that make up projections 25 are the same as the metal material(s) that make up main body 22. That is, projections 25 may comprise aluminum alloy(s). Projections 25 are formed by casting together with main body 22. Projections 25 serve the purpose of forming major grooves in the tire.

Figure 3:
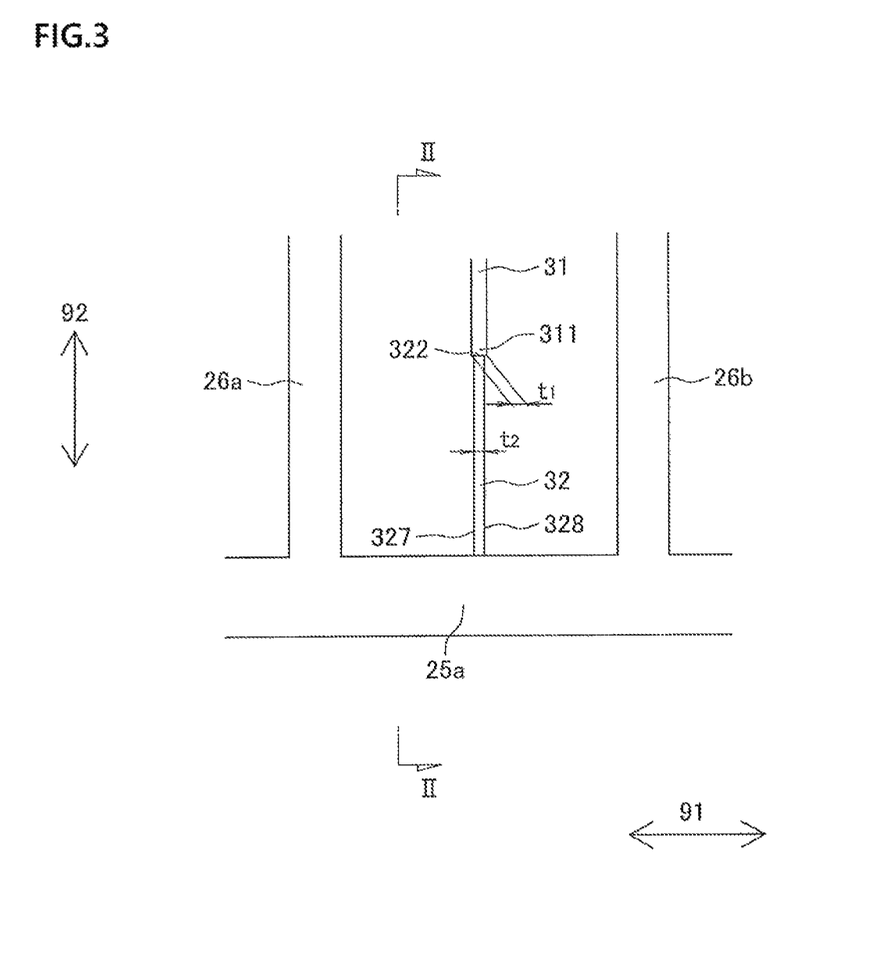
FIG. 3 Drawing showing a portion of the die as seen in the direction indicated by arrow X in FIG. 2.

As shown in FIG. 3, die 11 comprises projections 26a, 26b, (hereinafter sometimes referred to collectively as "projections 26") which extend along tread molding surface 21. Projections 26 extend in the tire width direction 92. Where it is said that "projections 26 extend in the tire width direction 92," this is intended to include both the situation in which projections 26 extend in uninclined fashion with respect to the tire width direction 92 and the situation in which projections 26 extend in inclined fashion with respect to the tire width direction 92. The metal material(s) that make up projections 26 are the same as the metal material(s) that make up main body 22. That is, projections 26 may comprise aluminum alloy(s). Projections 26 are formed by casting together with main body 22. Projections 26 serve the purpose of forming transverse grooves in the tire.

Die 11 comprises sipe blade(s) 32 extending in protruding fashion along tread molding surface(s) 21. Sipe blade 32 extends in the tire width direction 92. Where it is said that "sipe blade 32 extends in the tire width direction 92," this is intended to include both the situation in which sipe blade 32 extends in uninclined fashion with respect to the tire width direction 92 and the situation in which sipe blade 32 extends in inclined fashion with respect to the tire width direction 92. End 322 of sipe blade 32 comes in contact with cast projecting region 31. The two faces of sipe blade 32 may be defined such that there is a first face 327 and a second face 328. Although sipe blade 32 is planar, there is no limitation with respect thereto. For example, sipe blade 32 may be in the shape of a corrugated plate. Width $t_2$ of sipe blade 32 might for example be not greater than 2.0 mm, or might be not greater than 1.6 mm. The lower limit of the range in values for $t_2$ might for example be 0.3 mm, 0.6 mm, or the like. Width of sipe blade 32 is usually constant. Where width of sipe blade 32 is not constant, $t_2$ is measured at the location at which it comes in contact with first end 311 of cast projecting region 31. It is preferred that the maximum height of sipe blade 32 be not less than the maximum height of cast projecting region 31. The coefficient of linear expansion of the metal material(s) at sipe blade 32 is lower than the coefficient of linear expansion of the metal material(s) at cast projecting region 31. Regarding the metal material(s), sipe blade 32 may comprise stainless steel. As stainless steel, SUS303, SUS304, and so forth may be cited as examples. Sipe blade 32 may be provided at die 11 in the form of cast-in insert(s) (see FIG. 9).

Die 11 is provided with cast projecting region(s) 31 extending along tread molding surface(s) 21 from end 322 of sipe blade 32. Cast projecting region 31 is located nearer to the first contact patch edge than sipe blade 32. Cast projecting region 31 comes in contact with end 322 of sipe blade 32. Cast projecting region 31 extends in the tire width direction 92. Where it is said that "cast projecting region 31 extends in the tire width direction 92," this is intended to include both the situation in which cast projecting region 31 extends in uninclined fashion with respect to the tire width direction 92 and the situation in which cast projecting region 31 extends in inclined fashion with respect to the tire width direction 92. Although cast projecting region 31 is planar, there is no limitation with respect thereto. Width $t_1$ of cast projecting region 31 might for example be not greater than 4.0 mm. $t_1$ is measured at the location at which it comes in contact with end 322 of sipe blade 32. The ratio of the length $L_1$ of cast projecting region 31 to length $L_2$ of sipe blade 32 (i.e., $L_1/L_2$) might for example be 0.3 to 0.8, it being preferred that this be 0.3 to 0.5. The metal material(s) that make up cast projecting region(s) 31 are the same as the metal material(s) that make up main body 22. That is, cast projecting region(s) 31 may comprise aluminum alloy(s). Cast projecting region 31 is formed by casting together with main body 22.

Width $t_1$ of cast projecting region 31 is greater than width $t_2$ of sipe blade 32. For this reason, endurance when used repeatedly will be superior as compared with the situation in which $t_1$ is not greater than $t_2$. It is preferred that $t_1$ be not less than 1.1 times $t_2$, and more preferred that $t_1$ be not less than 1.2 times $t_2$. $t_1$ might for example be not greater than 2 times $t_2$, or might be not greater than 1.5 times $t_2$.

Figure 4:
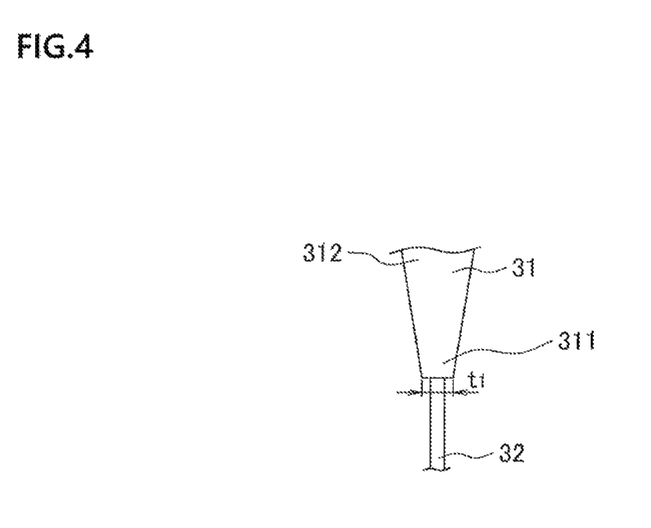
FIG. 4 Drawing showing Variation 1.

As shown in FIG. 4, in accordance with Variation 1, cast projecting region 31 may include a portion within which width increases as one proceeds from first end 311 toward second end 312. Width of cast projecting region 31 may increase as one proceeds from first end 311 toward second end 312 over only a portion thereof, or it may it increase in such fashion over the entirety of cast projecting region 31. As compared with a tire obtained in accordance with the example shown in FIG. 3, Variation 1 makes it possible to manufacture a tire that excels in water shedding characteristics.

Figure 5:
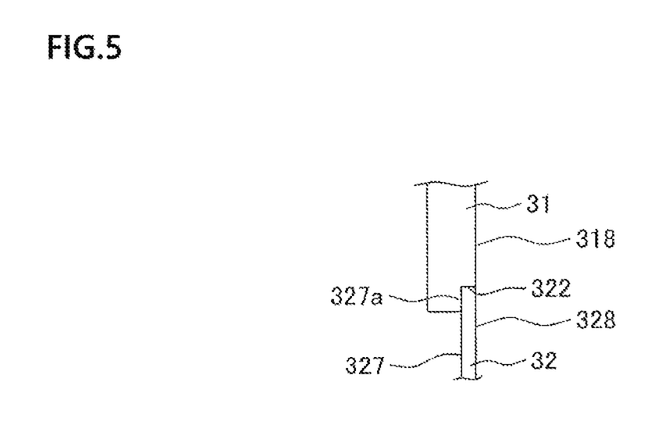
FIG. 5 Drawing showing Variation 2.

As shown in FIG. 5, in accordance with Variation 2, region 327a (hereinafter sometimes referred to as "first region 327a") peripheral to end 322 at first face 327 is covered by cast projecting region 31. Face 318 of cast projecting region 31 and second face 328 of sipe blade 32 come in contact with each other. That is, face 318 and second face 328 constitute a single face. Because first region 327*a* is covered by cast projecting region 31, endurance of Variation 2 is superior to that of the example shown in FIG. 3.

Figure 6:
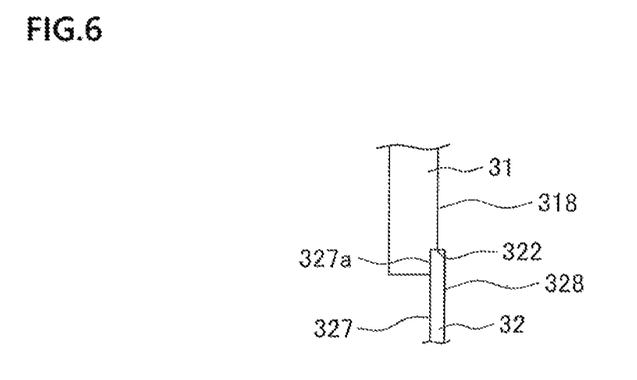
FIG. 6 Drawing showing Variation 3.

As shown in FIG. 6, in accordance with Variation 3, region 327*a* peripheral to end 322 at first face 327 is covered by cast projecting region 31. Face 318 of cast projecting region 31 and second face 328 of sipe blade 32 do not come in contact with each other. Because first region 327*a* is covered by cast projecting region 31, endurance of Variation 3 is superior to that of the example shown in FIG. 3.

Figure 7:
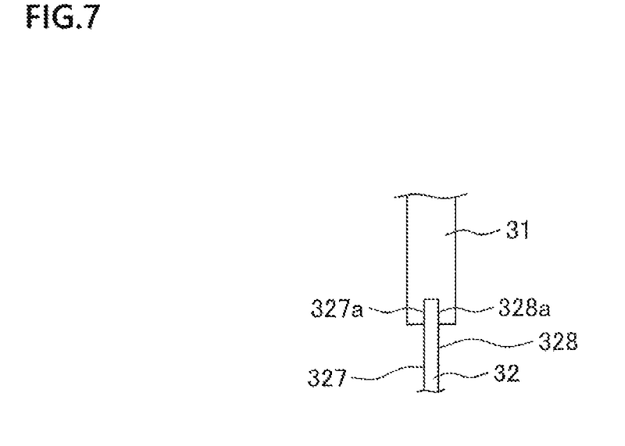
FIG. 7 Drawing showing Variation 4.

As shown in FIG. 7, in accordance with Variation 4, first region 327*a* at first face 327 of sipe blade 32 and region 328*a* (hereinafter sometimes referred to as "first region 328*a*") at second face 328 of sipe blade 32 are covered by cast projecting region 31. Endurance of Variation 4 is superior to that of the example shown in FIG. 3.

Figure 15:
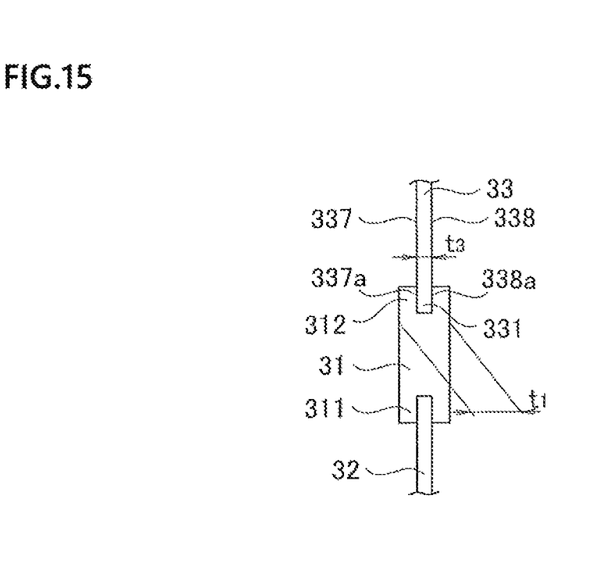
FIG. 15 Drawing showing Variation 5.

As shown in FIG. 15, in accordance with Variation 5, sipe blade 33 extends from second end 312 of cast projecting region 31. Cast projecting region 31 is located between sipe blade 33 and sipe blade 32. Thus, in accordance with Variation 5, cast projecting region 31 connects sipe blade 33 and sipe blade 32. Sipe blade 33 comes in contact with cast projecting region 31 at end 331 of sipe blade 33. While width $t_1$ of cast projecting region 31 may be greater than, less than or equal to width $t_3$ of sipe blade 33, it is preferred that width $t_1$ of cast projecting region 31 be greater than width $t_3$ of sipe blade 33. When $t_1$ is greater than $t_3$, endurance when used repeatedly will be excellent. It is preferred that $t_1$ be not less than 1.1 times $t_3$, and more preferred that $t_1$ be not less than 1.2 times $t_3$. $t_1$ might for example be not greater than 2 times $t_3$, or might be not greater than 1.5 times $t_3$. The two faces of sipe blade 33 may be defined such that there is a first face 337 and a second face 338. First region 337*a* peripheral to end 331 of first face 337 and first region 338*a* peripheral to end 331 of second face 338 are covered by cast projecting region 31. While it is preferred from the standpoint of endurance that first region 337*a* and first region 338*a* be covered in this way by cast projecting region 31, situations in which both are not covered thereby are acceptable.

Variations 1 through 5 may be combined as appropriate. For example, Variation 1 (see FIG. 4) may be combined with Variation 4 (see FIG. 7).

The first embodiment also admits of variations other than Variations 1 through 5. For example, whereas tire vulcanizing die 10 was provided with dies 11, 12, 13 at the first embodiment, it is also possible for this to be such that the die at the tread portion of the tire is split into a pair of dies that part at the center. Variations such as this may of course also be combined as appropriate with Variations 1 through 5, described above.

Figure 13:
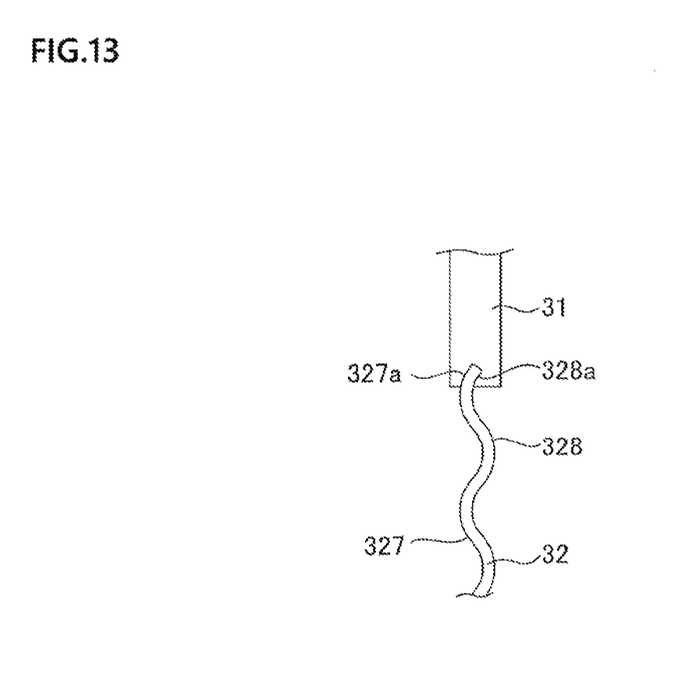
FIG. 13 Drawing showing an example in which a sipe blade is in the shape of a corrugated plate.

As has already been described, sipe blade 32 may be in the shape of a corrugated plate. So that there is no question with respect thereto, this is shown in FIG. 13. At FIG. 13, first region 327*a* at first face 327 of sipe blade 32 and first region 328*a* at second face 328 of sipe blade 32 are covered by cast projecting region 31. As has already been described, while it is preferred from the standpoint of endurance that first region 327*a* and first region 328*a* be covered in this way by cast projecting region 31, situations in which both are not covered thereby are acceptable.

Figure 14:
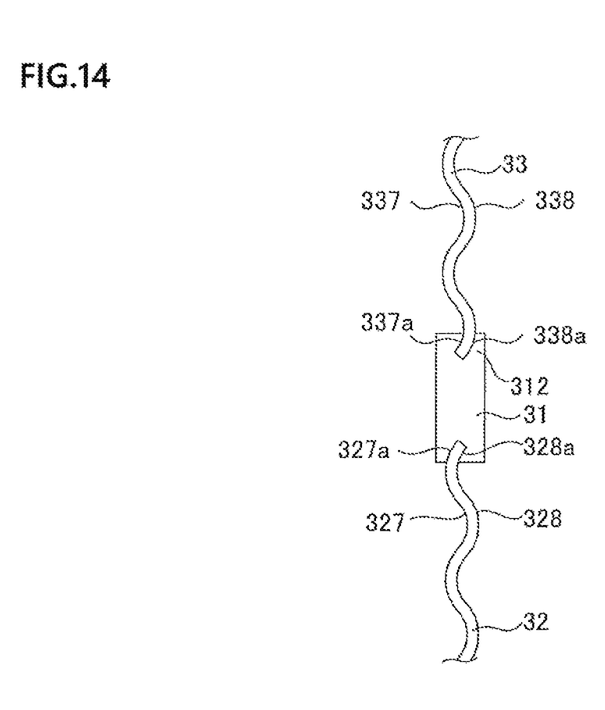
FIG. 14 Drawing showing another example (variation) in which a sipe blade is in the shape of a corrugated plate.

On the other hand, at FIG. 14, sipe blade 32 is in the shape of a corrugated plate, and sipe blade 33 which extends from second end 312 of cast projecting region 31 is also in the shape of a corrugated plate. Note, however, that sipe blade 33 may instead be planar. First region 337*a* at first face 337 of sipe blade 33 and first region 338*a* at second face 338 are covered by cast projecting region 31. While it is preferred from the standpoint of endurance that first region 337*a* and first region 338*a* be covered in this way by cast projecting region 31, situations in which both are not covered thereby are acceptable. Variations described here may be combined as appropriate with the aforementioned variations.

Figure 8:
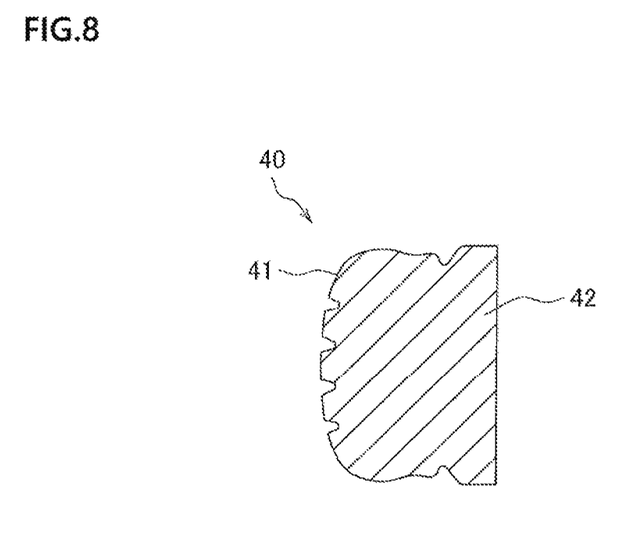
FIG. 8 Vertical sectional view showing in simplified fashion a casting die in accordance with a first embodiment.

As shown in FIG. 8, casting die 40 for casting tire vulcanizing die 10 is provided with casting die main body 42 having tread casting die surface 41. Tread casting die surface 41 serves the purpose of molding tread molding surface 21 of tire vulcanizing die 10. Casting die main body 42 is ordinarily made of gypsum.

Figure 9:
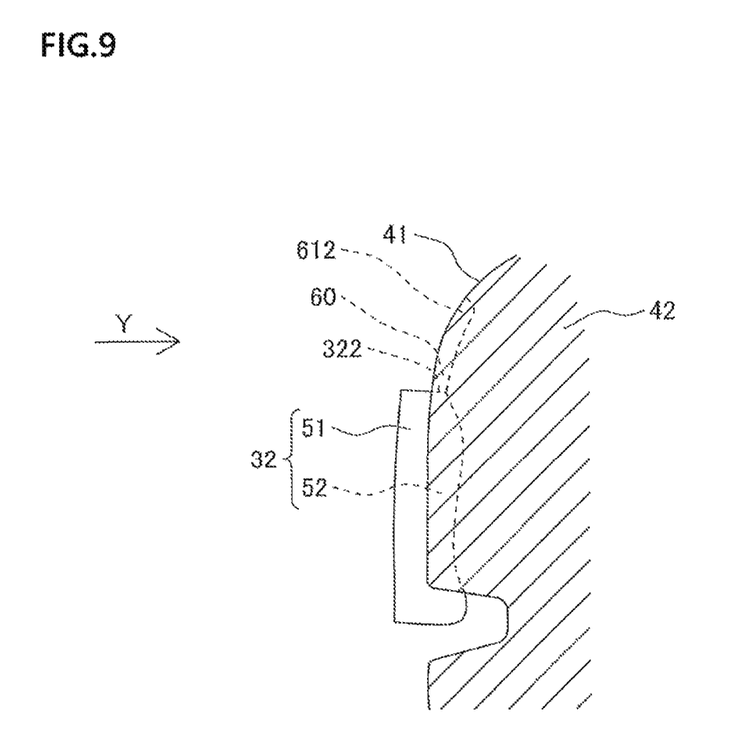
FIG. 9 Enlarged view of a portion of what is shown in FIG. 8.

As shown in FIG. 9, casting die 40 is provided with sipe blade(s) 32. Sipe blade 32 is provided with region(s) 51 to be buried which protrude from tread casting die surface 41. Region 51 to be buried may be in the shape of a plate. Sipe blade 32 is further provided with region(s) 52 to be exposed which are in the shape(s) of plate(s) and which are embedded in tread casting die surface 41. End 322 of region 52 to be exposed at sipe blade 32 is exposed by groove 60.

Groove 60 extending from end 322 of region 52 to be exposed at sipe blade 32 is provided at tread casting die surface 41. End 322 of region 52 to be exposed is exposed by groove 60. Groove 60 serves the purpose of molding cast projecting region 31 at tire vulcanizing die 10.

Figure 10:
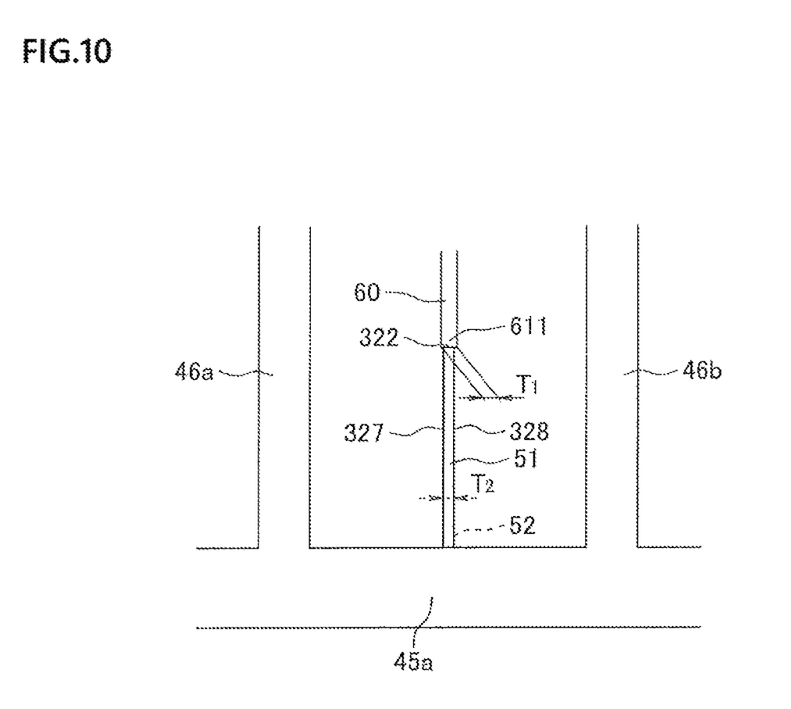
FIG. 10 Drawing showing a portion of the casting die as seen in the direction indicated by arrow Y in FIG. 9.

As shown in FIG. 10, width $T_1$ of groove 60 is greater than width $T_2$ of region 52 to be exposed. It is preferred that $T_1$ be not less than 1.1 times $T_2$, and more preferred that $T_1$ be not less than 1.2 times $T_2$. $T_1$ might for example be not greater than 2 times $T_2$, or might be not greater than 1.5 times $T_2$. $T_1$ is measured at the location where end 322 of region 52 to be exposed is present at sipe blade 32. $T_2$ might for example be not greater than 2.0 mm, or might be not greater than 1.6 mm. The lower limit of the range in values for $T_2$ might for example be 0.3 mm, 0.6 mm, or the like. Width of region 52 to be exposed is usually constant. Where width of region 52 to be exposed is not constant, $T_2$ is measured at the location where first end 611 of groove 60 is present.

Further provided at tread casting die surface 41 are grooves 45 (groove 45*a*, etc.) for molding projections 25 of tire vulcanizing die 10. Further provided at tread casting die surface 41 are grooves 46 (grooves 46*a*, 46*b*, etc.) for molding projections 26 of tire vulcanizing die 10.

Casting die 40 may employ variation(s) corresponding to any desired combination hereof and variation(s) on tire vulcanizing die 10 that were described above (Variations 1 through 5 and so forth). Below, the example of Variation V1 corresponding to Variation 1, and the example of Variation V4 corresponding to Variation 4, are addressed.

Figure 11:
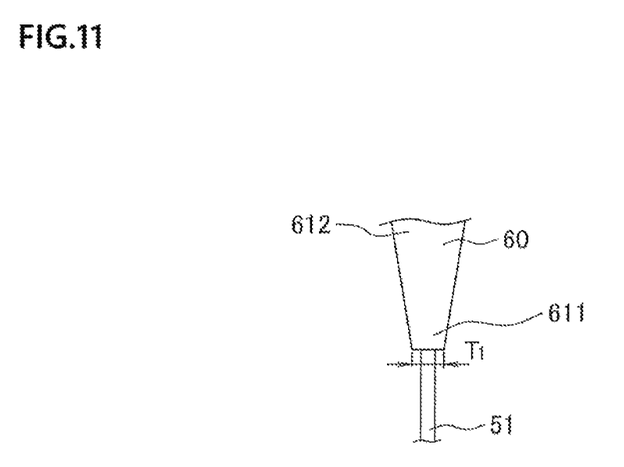
FIG. 11 Drawing showing Variation V1.

As shown in FIG. 11, in accordance with Variation V1 for example, groove 60 may include a portion within which width increases as one proceeds from first end 611 toward second end 612. Width of groove 60 may increase as one proceeds from first end 611 toward second end 612 over only a portion thereof, or it may it increase in such fashion over the entirety of groove 60.

Figure 12:
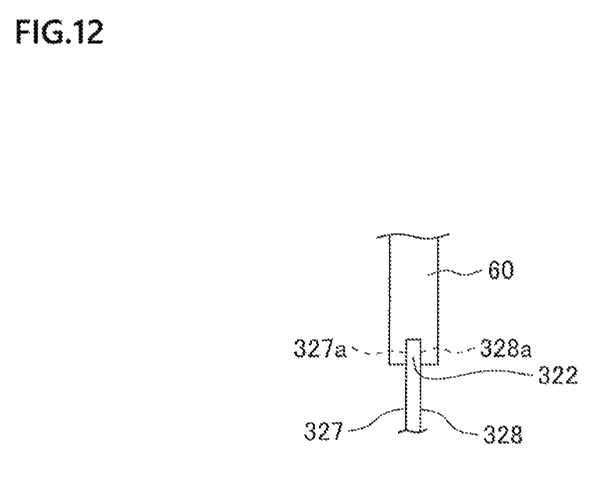
FIG. 12 Drawing showing Variation V4.

As shown in FIG. 12, in accordance with Variation V4, first region 327*a* peripheral to end 322 at first face 327 and first region 328*a* peripheral to end 322 at second face 328 are exposed by groove 60. Casting die 40 of Variation V4 is capable of casting a tire vulcanizing die having endurance when used repeatedly that is even more superior than that of the example shown in FIG. 10.

With Variation V4, there is less tendency for molten metal to enter space(s) between sipe blade 32 and casting die main body 42 than is the case with the example shown in FIG. 10. This is because first face 327 of sipe blade 32 and the groove wall that makes up groove 60 are present on different surfaces, and because second face 328 of sipe blade 32 and the groove wall that makes up groove 60 are present on different surfaces. Entry thereinto of molten metal can lead to formation of unintended metal thin films and/or may cause degradation of the casting surface. Variation V4 is impervious to entry thereinto of molten metal and permits manufacture of a tire vulcanizing die 10 having a good casting surface.

A method for manufacturing tire vulcanizing die 10 in accordance with the first embodiment includes an operation in which casting die 40 is used to cast tire vulcanizing die 10. Except for the fact that casting die 40 is used, the method for manufacturing tire vulcanizing die 10 may be carried out in similar fashion as at conventional operations.

The invention claimed is:

1. A tire vulcanizing die comprising:
a tread molding surface;
a sipe blade extending along the tread molding surface; and
a cast projecting region extending along the tread molding surface from an end of the sipe blade;
wherein width of the cast projecting region is greater than width of the sipe blade;
wherein the sipe blade has a first face;
wherein a region peripheral to the end of the first face is covered by the cast projecting region;
wherein the sipe blade has a second face; and
wherein a region peripheral to the end of the second face is covered by the cast projecting region.

2. The tire vulcanizing die according to claim 1 wherein width of the sipe blade is not greater than 1.6 mm.

3. The tire vulcanizing die according to claim 1 wherein the sipe blade comprises stainless steel; and
the cast projecting region comprises aluminum alloy.

4. A casting die for casting a tire vulcanizing die comprising:
a tread casting die surface for molding a tread molding surface of a tire vulcanizing die; and
a sipe blade provided with a region to be buried which protrudes from the tread casting die surface, and a region to be exposed which is embedded in the tread casting die surface;
wherein a groove extending from an end of the region to be exposed is provided at the tread casting die surface;
the end of the region to be exposed is exposed by the groove;
width of the groove is greater than width of the region to be exposed;
the sipe blade has a first face;
a region peripheral to the end of the first face is exposed by the groove;
the sipe blade has a second face; and
a region peripheral to the end of the second face is exposed by the groove.

5. The casting die for casting the tire vulcanizing die according to claim 4 wherein width of the region to be exposed is not greater than 1.6 mm.

6. The casting die for casting the tire vulcanizing die according to claim 4 wherein the sipe blade comprises stainless steel.

* * * * *